May 23, 1967 G. E. RICKERT ET AL 3,320,671

LUMINOUS RETICLE FOR A SIGHTING TELESCOPE

Filed Sept. 26, 1963

1405
X1436
X1631

INVENTORS
GLENN E. RICKERT
ROGER M. RICKERT
BY Albert L. Jeffers
ATTORNEY

2P

United States Patent Office 3,320,671
Patented May 23, 1967

3,320,671
LUMINOUS RETICLE FOR A SIGHTING TELESCOPE

Glenn E. Rickert, Community State Bank Bldg., Huntington, Ind. 46750, and Roger M. Rickert, Huntington, Ind.; said Roger M. Rickert assignor to said Glenn E. Rickert Filed Sept. 26, 1963, Ser. No. 311,790
5 Claims. (Cl. 33—50)

This application is a continuation-in-part of copending application Ser. No. 192,888, filed May 7, 1962, now Patent No. 3,121,163.

This invention relates to a luminous reticle for optical instruments, and more particularly relates to reticles used in rifle telescopes and similar instruments.

Reticles in optical instruments are of two general types. The first type is the silhouette type which is commonly used in rifle telescopes and similar instruments and the marks or pattern of the reticle appear as a black silhouette against the background being viewed. The second type is the electrically illuminated reticle, and the pattern or marks of the reticle are made to appear luminous or to glow, with the energy for the glow coming from batteries or other electrical source.

In the electrically illuminated reticle type, the marks can be very fine in size, and also they can be used in very dim or very bright lighting conditions, still being easy for the observer to see. This type has the disadvantage, however, of being bulky and being expensive to build and maintain because of the light bulb, housing and electrical supply. In fact, in portable instruments such as a rifle telescope, the problems become almost prohibitive, and the silhouette type reticle is generally used.

In the silhouette type, however, a problem is present where the pattern marks must be comparatively large in size or they are too difficult to see against certain backgrounds in good light conditions, and very difficult to see with any background in dim light conditions. Yet when the marks are made sufficiently large to be quickly and easily seen, they tend to hide too much of the view, particularly where critical alignment is needed on small objects, such as is experienced in using a rifle telescope.

The primary object of the invention is to provide a luminous reticle of greater brightness than is known in the prior art, without the use of electrical energy.

Another object of the invention is to provide an improved luminous reticle which can be more easily seen in dim light and poor background conditions, and in addition, be easily seen in very bright background conditions.

A salient object of the invention is to provide a means whereby finer reticle marks or patterns may be used than would otherwise be practical by making the pattern appear to glow in a vivid color which contrasts with the colors normally found in the background view.

A further object of the invention is to provide a reticle system where the proportionate brightnesses of the reticle marks and the target view, can be set as desired.

A still further object of the invention is to provide a reticle of the plate variety which is free of the troublesome dirt collection characteristic of conventional reticle plates.

Additional objects, advantages and features of invention reside in the construction, arrangement and combination of parts involved in the embodiment of the invention, as will be apparent or understood from the following description and accompanying drawings, wherein.

Figure 1:
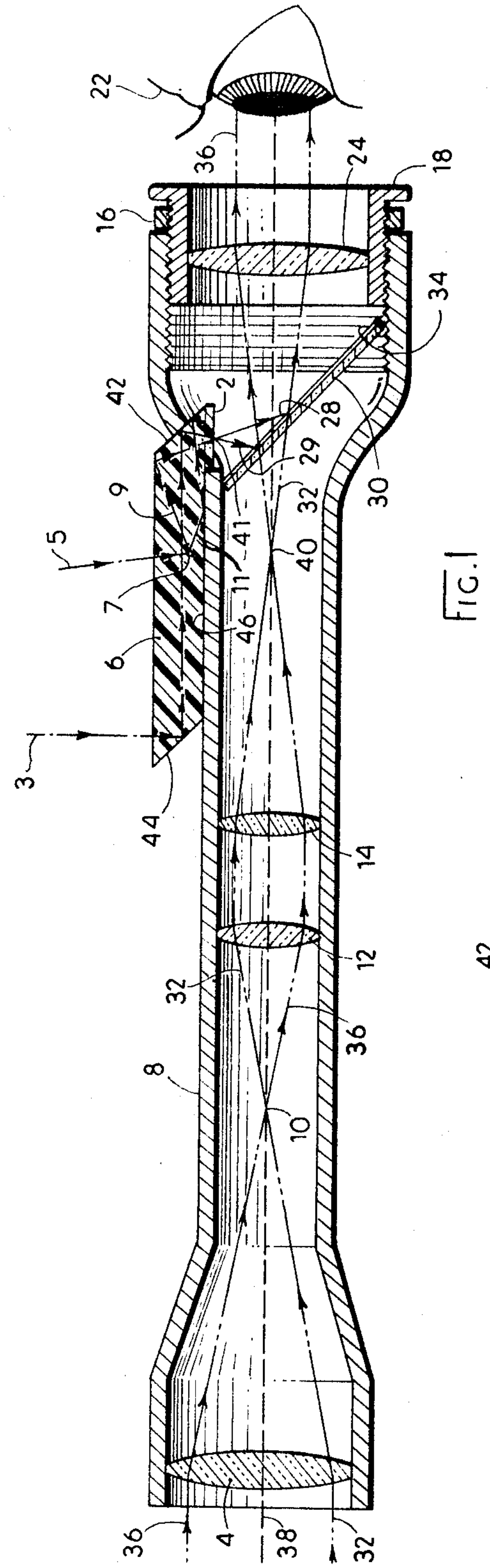
FIGURE 1 is a cross-sectional view of one form of our invention as applied to a rifle telescopic sight.

Referring to the drawings, and more particularly to FIGURE 1, the rifle telescope sight body 8 holds the objective lens 4, erector lenses 12, 14 and eyepiece lens 24 and is shown here to demonstrate the use of our invention in one kind of optical instrument.

Attention is directed to the reticle illuminator 6 with is bottom side 46 with reticle 2, and angled ends 42, 44. These parts are located in proper relationship to the eyepiece focal point 40, reflected focal point 41 and the beam splitter 30 with its semitransparent mirror coating 34 to make the reflected reticle image appear to be in a plane about at focal point 40.

Other parts are shown to help visualize our invention by showing it in a rifle telescopic sight where light rays 32, 36, center line 38, objective lens focal point 10, eyepiece focusing ring 18 and locking ring 16 are illustrated. Light rays 32, 36 indicate the light pathway through the optical instrument and cross at the focal planes located at focal points 10, 40.

Figure 2:
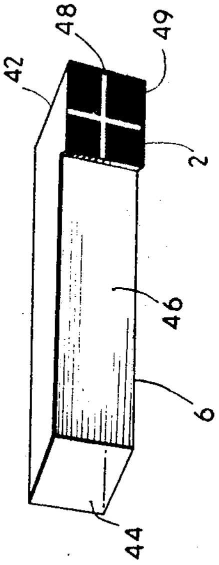
FIGURE 2 is an enlarged three-dimensional view of the reticle illuminator 6, FIG. 1 with a reticle in place.

A reticle illuminator 6 is shown in FIGURE 2 in an enlarged three-dimensional view, with the bottom side 46 tipped up showing the reticle 2 which has an opaque face 49 with transparent or translucent lines or indicia 48 which are lighted from the rear by the reticle illuminator 6. If an opaque reticle is used, the opaque portion of the face 49 of the reticle should be black or dark in color, or unlighted if not dark colored. The remainder of the bottom side 46 can be silvered or otherwise made reflective, as can all areas of the illuminator 6 where it is in contact with or shielded by the structure which mounts it to the telescope body 8. The angled ends 42, 44 can also be coated to be reflective if desired, or be left uncoated and depend only upon total internal reflection principles for directing the light to the reticle 2. All reflective coated areas may then be coated with a black or dark exterior coating if desired.

An available incident light ray 3 is shown reflecting off of the angled ends 44 and 42 to illuminate the reticle 2. Another available incident light ray 5 is shown striking a fluorescent, phosphorescent of other so-called self-light particle 7 which then radiates its light.

Although many rays are given off by such a particle 7, for reasons of clarity, only two rays, 9, 11 of this radiation are shown, which rays are conducted by total internal reflection principles or reflective surfaces to pass through or illuminate reticle 2. Another ray from surface 44 might strike a self-light particle and act as did ray 5.

The reticle 2 is viewed by way of rays 28, 29 by the observer's eye 22 using the eyepiece lens 24 and reflective surface 34 of the beam splitter 30 while at the same time the eye 22 is viewing the image of the target in the area of focal point 40 by looking on through the beam splitter 30 by way of rays 32, 36 to the focal point 40.

In this manner the reticle can be made to appear to be in a plane at or about focal point 40 and optically in focus with the target image which is also at or about focal point 40. This process could be reversed where the image of the target is reflected and the reticle is viewed by looking through the beam splitter, providing a suitable beam splitter is used.

In order to keep the target view highly discernable, the reticle may be opaque except for the indicia, or the face of the reticle is black or dark in color or unlighted, so that only the reticle indicia are visible to the observer's eye. In addition, the area of the reticle illuminator which contacts the reticle may be silvered or otherwise made reflective, except in the areas of the indicia, in order to increase the brightness and efficiency of the illuminator.

The beam splitter 30 can be a semitransparent mirror a shown in the drawings, or can be any one of the several other types of beam splitters. The mirror type is shown for reasons of clarity of illustration.

A semitransparent mirror having an interference type coating is desirable because of its efficiency in either reflecting or transmitting the light with very little energy lost by absorption.

The choice of the percentages of reflection and transmission of the beam splitter depends upon the amount of light directed to the reticle by the reticle illuminator. In general the longer the illuminator the more light it will produce at the reticle end. Near maximum brightness is reached in bars or sheets which are five to seven inches long when commercial Plexiglas fluorescent yellow #2086 is used. A bar as short as one inch is nearly as bright, however, if an angled end such as 44 is used to help direct the normally available overhead light toward the reticle end. If square ended bars or sheets are used it is advantageous to make the ends or edges reflective by a coating, when shorter lengths are used. Many other shapes of bars, blocks, sheets, tubes or rings of illuminator material may be used. Several such illuminators are illustrated in co-pending patent application, Ser. No. 192,888, now Patent No. 3,121,163.

Because of the relatively high brightness produced by the fluorescent plastic called Plexiglas Yellow #2086 and similar materials, and because of their economy, this type of illuminator material is described in some detail here as a suitable material. It is obvious, however, once our invention is understood, that the fluorescent optical material in the illuminator could be replaced by a different fluorescent color or by phosphorescent, radioactive, glow in the dark, or several other of the self-light materials, or the reticle 2 could be simply coated on the rear side with a thin coating of such material to illuminate the reticle indicia more directly. Such substitution, however, does not depart from the spirit of the invention. A combination of these self-light materials may be used as or in an illuminator. In some of these materials, intensity is gained when the higher frequency ranges of light strike the particle involved and it gives off a lower frequency range of light of greater intensity.

In order to retain the relative brightness of the target view when our reticle system is incorporated in a telescopic sight, it may be desirable in some cases to increase the diameter of the objective lens, or otherwise increase the light gathering ability of the telescope. This change will be in relation to the percentage of transmission loss of the beam splitter.

In general the reticle can be made to appear sufficiently bright by using a beam splitter which reflects about 33 percent and transmits about 67 percent. With such a beam splitter the light gathering ability of the objective lens may need to be increased by increasing its area to 1½ times the original area. For a lens of 20 mm. in diameter, an increase to about 24 mm. gives a 1½ times increase in its area. If the beam splitter is adapted to be frequency selective in its reflectance, however, such that it would for example reflect 40 percent or more of the relatively monochromatic light (perhaps orange like) coming from the reticle and transmit over 75 percent of the heterochromatic light coming from the target view, it may not be necessary to increase the light gathering ability of the telescope using our reticle system. Such a mirror is sometimes called a dichroic beam combining mirror and may be coated with a sharp-cutting multiple layer type interference filter coating. This general type of coating is shown in U.S. Patents 2,552,184 by Koch and 2,379,790 and 2,412,496 by Dimmick.

Wire reticles, where the wires are stretched across an opening at a focal point or plane of a telescope are not troublesome in collecting dust. However, it is difficult to get a complicated reticle pattern with stretched wires. For this reason plate reticles are sometimes desired since quite complicated indicia can be put on the reticle plate by a photographic or similar process. These plates, however, being mostly transparent, and at a focal point of the telescope tend to collect annoying dust and dirt particles which appear sharply in focus to the observer. It should be noted that there is nothing to collect dirt at focal points 10, 40 FIGURE 1 in our invention and that a so-called opaque reticle is located at reflected focal point 41 and that opaque reticles are not easily troubled by dirt problems.

As there are many types of telescopes and other optical instruments into which anyone skilled in the art may incorporate our reticle system, it would be confusing to show all the variations. In the interest of clarity, only one form of the invention is shown in FIGURES 1 and 2 to illustrate the principles involved.

For example, in some cases it may be desirable to locate the beam splitter and recticle forward of the erector lenses 12, 14 near the focal point 10 instead of near the focal point 40 as shown in FIGURE 1, in order to be able to use more economical lenses, or for adjustment or other reasons.

As another example, referring to FIGURE 1, it might be adventageous, for structural or other reasons, to move the recticle illuminator 6 reticle 2 and beam splitter 30 forward or rearward with respect to the focal point 40. In this case if a proper lens is used between the reticle 2 and the beam splitter 30 it will cause the recticle indicia to again appear to be located in focus at or about the focal point 40.

Figure 3:
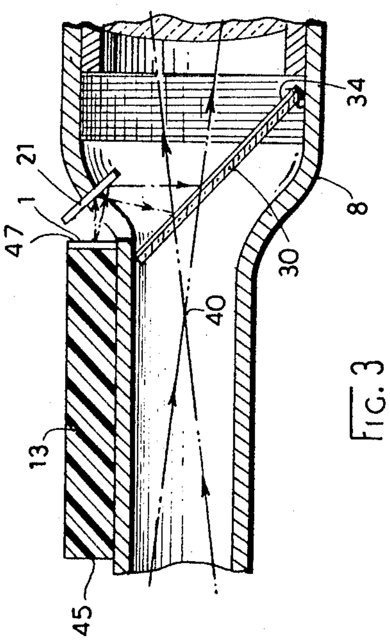
FIGURE 3 is a cross-sectional view of another form of our invention as applied to a rifle telescope.

Another variation of our invention is shown in FIGURE 3, where a portion of a rifle telescope body 8 is shown in cross section with a reticle illuminator 13 having squared off ends 45, 47 and reticle 1. The proper positioning of these parts with respect to the fully reflective mirror 21, the beam splitter 30 and the focal point 40 causes the image of the reticle 1 to appear at or about focal point 40.

Again many variations are possible, for example, the fully reflective mirror 21 might be replaced by a prism or focusing mirror or a combination of a plane mirror and a lens, etc. Also end 45 could be angled as end 44 in FIGURE 1 instead of squared off.

The face of reticle 1 should be black, dark colored or unlighted as suggested for the face of reticle 2 FIGURE 1 and for the same reasons.

The beam splitter in FIGURE 1 can be equally reflective over all of its area, or can be more reflective in some areas than others, or can even be cut away in areas. Other types of beam splitters like double refracting crystals, a pair of prisms etc., can be similarly adapted.

A piece of light deviating prism may be used to introduce the image of the reticle into the instrument light pathway by occupying a portion of the pathway to achieve superimposition of target and reticle images. The opposite can be done by using the prism to introduce the target image into the light pathway from the reticle.

Also, a number of conventional adjustment systems for windage and elevation as well as paralax corrections may be adapted by anyone skilled in the art to be used along with our reticle system in their particular type of telescopic sight. Similar adaptations may be required to use our reticle system in other optical instruments.

It is useful under certain conditions to have available an auxiliary silhouette reticle where it can enhance, or substitute for our luminous reticle, by bracketing it, superimposing upon it, or otherwise acting as an auxiliary to it, either in a constantly present arrangement or in an alternate to it arrangement.

While we have disclosed the invention with particularly in the best form known to us it will nevertheless be understood that changes in structure and arrangement, and substitution of materials and equivalents, mechanical or otherwise, may be made without departing from the spirit of the invention as here disclosed and as set forth in the appended claims.

We claim:

1. A luminous reticle system for a sighting telescope comprising:
   (a) an opaque reticle having light transmitting indicia,
   (b) a reticle illuminator means adapted to be energized by available incident light and to emit fluorescent light,
   (c) means for directing said fluorescent light to said reticle indicia for illuminating the reticle indicia, and
   (d) a beam splitter means adapted to direct uncollimated light in an uncollimated manner from said reticle indicia to a focal plane of the sighting telescope for purposes of aligning the distant images with said reticle indicia.

2. A luminous reticle for an optical instrument comprising:
   (a) an opaque reticle having light transmitting indicia,
   (b) a reticle illuminator means adapted to be energized by available incident light and to emit fluorescent light,
   (c) means for directing said fluorescent light to said reticle indicia for illuminating the reticle indicia, and
   (d) a beam splitter means having a semitransparent reflecting surface which is a dichroic interference coating having a reflection maximum in the wavelength range of the reticle indicia illumination, said beam splitter means adapted to provide an uncollimated image of said reticle indicia at a focal plane of an optical instrument.

3. A luminous reticle for an optical instrument having luminous reticle indicia located at other than a focal plane of the optical instrument, and a beam splitter positioned to provide an uncollimated image of said indicia approximately at a focal plane of the optical instrument.

4. A luminous reticle for an optical instrument comprising:
   (a) an opaque reticle having light transmitting indicia,
   (b) a reticle illuminator means adapted to be energized by available incident light or a higher frequency range and to emit light of a lower frequency range,
   (c) means for directing asid lower frequency range light to said reticle indicia for illuminating the reticle indicia, and
   (d) a beam splitter means adapted to optically superimpose said reticle indicia in an uncollimated manner with a focal plane of an optical instrument.

5. A luminous reticle for an optical instrument comprising:
   (a) an opaque reticle having light transmitting indicia,
   (b) a reticle illuminator means adapted to be energized by available incident heterochromatic light and to emit relatively monochromatic light,
   (c) means for directing said relatively monochromatic light to said reticle indicia for illuminating the reticle indicia, and
   (d) a beam splitter means adapted to optically superimpose said reticle indicia in an uncollimated manner with a focal plane of an optical instrument.

References Cited by the Examiner

UNITED STATES PATENTS

| | | | |
|---|---|---|---|
| 2,472,809 | 6/1949 | Decker | 88—1 X |
| 2,780,129 | 2/1957 | Wood | 88—1 X |

ARCHIE R. BORCHELT, *Primary Examiner.*

UNITED STATES PATENT OFFICE
CERTIFICATE OF CORRECTION

Patent No. 3,320,671 May 23, 1967

Glenn E. Rickert et al.

It is certified that error appears in the above identified patent and that said Letters Patent are hereby corrected as shown below:

Column 6, line 8, "light or a higher" should read -- light of a higher --; line 10, "directing asid lower" should read -- directing said lower --.

Signed and sealed this 20th day of January 1970.

(SEAL)
Attest:

Edward M. Fletcher, Jr.
Attesting Officer

WILLIAM E. SCHUYLER, JR.
Commissioner of Patents